United States Patent [19]

Muraki et al.

[11] Patent Number: 5,500,482
[45] Date of Patent: Mar. 19, 1996

[54] RUBBER COMPOSITION FOR TIRE TREAD

[75] Inventors: Takao Muraki, Shinshiro; Yasuhiro Ishikawa, Hiratsuka, both of Japan

[73] Assignee: The Yokohama Rubber Co., Ltd., Tokyo, Japan

[21] Appl. No.: 306,954

[22] Filed: Sep. 16, 1994

[30] Foreign Application Priority Data

Sep. 20, 1993 [JP] Japan .................... 5-233754

[51] Int. Cl.$^6$ ................ C08K 7/02; C08K 9/06
[52] U.S. Cl. .............. 525/98; 525/232; 525/241
[58] Field of Search ................ 525/98, 232, 241

[56] References Cited

U.S. PATENT DOCUMENTS

| | | | |
|---|---|---|---|
| 5,066,729 | 11/1991 | Stayer, Jr. et al. | 525/315 |
| 5,248,722 | 9/1993 | DeTrano et al. | 524/496 |
| 5,284,898 | 2/1994 | Thise | 524/495 |

FOREIGN PATENT DOCUMENTS

| | | |
|---|---|---|
| 55-12133 | 1/1980 | Japan . |
| 56-127650 | 10/1981 | Japan . |
| 57-5520 | 1/1982 | Japan . |
| 57-73030 | 5/1982 | Japan . |
| 59-117514 | 7/1984 | Japan . |
| 61-14214 | 1/1986 | Japan . |
| 61-103902 | 5/1986 | Japan . |
| 61-141741 | 6/1986 | Japan . |
| 3-239737 | 10/1991 | Japan . |
| 3-252431 | 11/1991 | Japan . |
| 3-252433 | 11/1991 | Japan . |

*Primary Examiner*—W. Robinson H. Clark
*Attorney, Agent, or Firm*—Finnegan, Henderson, Farabow, Garrett & Dunner

[57] ABSTRACT

A rubber composition for a tire tread comprising (i) 100 parts by weight of a rubber component comprising (a) natural rubber and (b) a styrene-butadiene copolymer rubber having a vinyl content in the butadiene portion of 35 to 80% by weight and a styrene content of 10 to 40% by weight wherein the total amount these rubbers is at least 80 by weight of the total rubber component and wherein the amount of the styrene-butadiene copolymer rubber, is 20 to 60% by weight of the total rubber component, (ii) 20 to 70 parts by weight of silica and (iii) 20 to 70 parts by weight of carbon black.

4 Claims, No Drawings

RUBBER COMPOSITION FOR TIRE TREAD

BACKGROUND OF THE INVENTION

1. Field of the Invention

The present invention relates to a rubber composition for a tread of a pneumatic tire. More particularly, it relates to a rubber composition for a tread of a pneumatic tire capable of simultaneously satisfying the wet skid resistance, rolling resistance, and wear resistance.

2. Description of the Related Art

Along with the social needs for energy conservation and resource conservation in automobiles, research for reducing the rolling resistance of tires for improving the fuel economy of automobiles has become more important in the tire industry. It is well known that the fuel consumption can be lowered by decreasing the rolling resistance of the tire.

To decrease the rolling resistance of tires, it is effective to use rubber with a small hysterisis loss for the tread rubber. However, use of a rubber with a small hysterisis loss tends to lower the skid resistance on wet road surfaces, that is, the wet skid resistance. These two characteristics are in a contradictory relationship. Therefore, it has been difficult in the past to simultaneously satisfy the two characteristics of the rolling resistance and wet skid resistance in a tire.

Recently, the correspondence between the rolling resistance and wet skid resistance of tires and the viscoelasticity of the rubber composition has been theoretically demonstrated. It has been shown that to decrease the rolling resistance at the time of tire use, and for low fuel consumption, it is effective to decrease the hysterisis loss of the tread rubber, that is, to decrease the dynamic loss (i.e., tan $\delta$) at a temperature (i.e., running temperature) of 50° to 70° C. Contrary to this, the wet skid resistance is closely correlated viscoelastically with the dynamic loss at low temperatures, in actuality, close to 0° C., since the frequency of deformation for following the surface roughness of the road is large. Accordingly, improvement of the grip performance of a tire requires that the tan $\delta$ near 0° C. be made larger.

As a method for decreasing the hysterisis loss, it is known to be effective to use rubber with a low glass transition temperature, for example, a high cis-polybutadiene or natural rubber. This decreases the tan $\delta$ at 0° C., however, so the wet skid resistance is decreased and it is difficult to obtain both a high wet skid resistance and a low rolling resistance.

In recent years, numerous proposals have been made on inventions satisfying the above contradictory properties based upon the advances in solution polymerization of SBR and BR. For example, Japanese Unexamined Patent Publication (Kokai) No. 55-12133 and Japanese Unexamined Patent Publication (Kokai) No. 56-127650 propose a high vinyl polybutadiene rubber, while Japanese Unexamined Patent Publication (Kokai) No. 57-5520 and Japanese Unexamined Patent Publication (Kokai) No. 57-73030 proposes a high vinyl styrene-butadiene copolymer rubber.

Further, Japanese Unexamined Patent Publication (Kokai) No. 59-117514, Japanese Unexamined Patent Publication (Kokai) No. 61-103902, Japanese Unexamined Patent Publication (Kokai) No. 61-14214, Japanese Unexamined Patent Publication (Kokai) No. 61-141741, etc. propose to decrease the heat buildup by the use of a modified polymer introducing a functional group such as benzophenone or isocyanate into the molecular chain of the polymer. Further, Japanese Unexamined Patent Publication (Kokai) No. 3-239737 shows that it is possible to achieve a high wet skid resistance, low rolling resistance, and high wear resistance at the same time by using a styrene-butadiene copolymer rubber (SBR) having a specific styrene chain.

Further, Japanese Unexamined Patent Publication (Kokai) No. 3-252431 proposes a combination of an SBR having a specific styrene chain and a silane coupling agent, while Japanese Unexamined Patent Publication (Kokai) No. 3-252433 proposes to achieve the three characteristics of the wet skid resistance, rolling resistance, and wear resistance by causing a reaction between terminal-modified SBR and silica.

However, none of these proposals satisfies the above three characteristics in the performance thereof.

SUMMARY OF THE INVENTION

Accordingly, the object of the present invention is to provide a rubber composition for a tire tread having the improved characteristics of the wet skid resistance, the rolling resistance, and the wear resistance.

Other objects and advantages of the present invention will be apparent from the following description.

In accordance with the present invention, there is provided a rubber composition for a tire tread comprising (i) 100 parts by weight of a rubber component comprising natural rubber and a styrene-butadiene copolymer rubber having a vinyl content in the butadiene portion of 35 to 80% by weight and a styrene content of 10 to 40% by weight wherein the total amount of these rubber components is at least 80% by weight of the total rubber component and wherein the amount of the styrene-butadiene copolymer rubber is 20 to 60% by weight of the total rubber component, (ii) 20 to 70 parts by weight of silica and (iii) 20 to 70 parts by weight of carbon black.

DESCRIPTION OF THE PREFERRED EMBODIMENTS

The present inventors engaged in intensive studies to achieve the above-mentioned object and, as a result, succeeded in obtaining a tire tread rubber composition simultaneously improved in the above-mentioned three characteristics by using a styrene-butadiene copolymer rubber (SBR) having a specific microstructure in a system comprised of a blended rubber system including natural rubber and SBR, blended with carbon black and a silica filler.

The present invention was made to achieve the above-mentioned object. The inventors investigated a method for improving the dispersion of carbon black and silica filler ordinarily used in the rubber industry in a blend system of natural rubber and SBR when simultaneously using the two fillers and discovered an interesting fact.

That is, in a rubber composition including a silica filler, the extent of the dispersion of the silica has a large effect on the physical properties of the tire. That is, the better the extent of dispersion, the greater the amount of bound rubber. The tan $\delta$ curves at 0° C. and 50° C. also become sharp in gradient. On the other hand, it was learned that even if the dispersion of the carbon black is improved to increase the amount of the bound rubber, the same effect is observed. Therefore, the present inventors et al. engaged in various studies for improving the dispersion of the two and discovered that the following constitution is preferable.

First, in the blend system of natural rubber and SBR, the silica more easily disperses into the natural rubber phase for reaction with the natural rubber, and, therefore, when the natural rubber and SBR are made compatible with each other, it is possible to cause the silica filler to be uniformly dispersed in the system.

Next, when the SBR is terminal-modified with N,N-dimethylnicotine amide, N,N,N',N'-tetramethylurea, N,N,N',N'-tetramethylaminoacetoamide, N-methyl-2pyrolidone, N-methyl-ε-caprolactam, 4,4'-bis(diethylaminobenzophenone), diphenylmethanediisocyanate, etc. the affinity with carbon black increases, and therefore, the dispersion of the carbon black in the SBR can be improved. Accordingly, in this case where the SBR and natural rubber are compatible with each other, it is possible to disperse the carbon black uniformly in the system.

Accordingly, to make the silica which is distributed well in the natural rubber and the carbon black which is distributed well in the SBR uniformly disperse in the blend system of the natural rubber and the SBR, it is sufficient to make the natural rubber and SBR compatible with each other. Regarding the natural rubber and SBR, the higher the vinyl content of the butadiene portion of the SBR, the better the compatibility with the natural rubber, so it is possible to make the silica which is distributed well in the natural rubber and the carbon black which has affinity with the SBR uniformly disperse in the blend system of the natural rubber and SBR by making the natural rubber and SBR compatible with each other.

Therefore, the present inventors studied the compatibility of the vinyl content of the butadiene portion of the SBR and the natural rubber and thereupon discovered that natural rubber is compatible with SBR even in amounts smaller than the vinyl content spoken of in references etc. This is because the rubber material used in the rubber industry is generally kneaded by a mixer or rolls, so there is the effect of mechanical dispersion of the polymer by the strong shear force, and therefore, the compatibility can be imparted even with a low amount of vinyl by mixing the solutions. The present inventors investigated the lower limit of the amount of vinyl and found that it was 35% by weight, preferably 40% by weight. The high vinyl SBR used here enables the tan δ values at 0° C. and 50° C. to be made sharper in gradient compared with low vinyl SBR, so is excellent in that it enables the effect to be increased synergistically with the sharp gradient effect caused by the effect of dispersion of the silica. Further, when natural rubber is used, this is effective for the strength, embrittlement temperature, ice skidding, and other low temperature performance. Regarding the terminal-modification of SBR, Japanese Unexamined Patent Publication (Kokai) No. 3-252433 proposes an invention for improving the affinity between the SBR chain and silica by terminal-modification by alkoxysilane etc. at the polymerization terminals of the SBR. However, it is possible to increase the affinity of the modified SBR ends and silica, but not possible to increase the affinity of the carbon black and SBR, and therefore, the dispersion of the carbon black in the SBR becomes insufficient. Therefore, to avoid these problems, according to the present invention, it was learned that the method of having the silica increase the affinity with the natural rubber and having the carbon black increase the affinity with the SBR and further making the natural rubber and SBR compatible is advantageous for better dispersion.

That is, according to the present invention, in 100 parts by weight of the starting rubber including the natural rubber and SBR, the total amount of the natural rubber and SBR should be at least 80% by weight and, further, 20 to 60% by weight of SBR is included, the styrene content of the SBR being from 10 to 40% by weight and the vinyl content of the butadiene being from 35 to 80% by weight. Further, the terminals of the SBR are preferably terminalmodified at the time of polymerization by N,N-dimethylnicotine amide, N,N,N',N'-tetramethylurea, N,N,N',N'-tetramethylaminoacetoamide, N-methyl-2pyrrolidone, N-methyl-ε-caprolactam, 4,4'-bis(diethylaminobenzophenone), diphenylmethane-diisocyanate, etc.

The vinyl content in the styrene-butadiene copolymer usable for the composition of the present invention is from 35 to 80% by weight, preferably 40 to 70% by weight. When the vinyl content in the SBR is less than 35% by weight, the compatibility with the natural rubber is insufficient and the dispersion does not reach the desired level. Conversely, when the vinyl content is more than 80% by weight, the wear resistance remarkably falls, and therefore, this is not preferred.

The styrene-butadiene copolymer (SBR) usable in the present invention is obtained by copolymerization of styrene and butadiene using a lithium catalyst and then performing end-modification with N,N-dimethylnicotine amide, N,N,N',N'-tetramethylurea, N,N,N',N'-tetramethylaminoacetoamide, N-methyl-2-pyrrolidone, N-methyl-ε-caprolactam, 4,4'-bis(diethylaminobenzophenone), diphenylmethanediisocyanate, etc. The bound styrene content in the styrene-butadiene copolymer usable in the present invention is 10 to 40% by weight, preferably 20 to 30% by weight. When the bound styrene content is less than 10% by weight, the wet skid resistance becomes lower, whereas when the bound styrene content is more than 40% by weight, the rolling resistance becomes higher, and therefore, this is not preferred.

The blending ratio (i.e., weight ratio) of the natural rubber and SBR used in the present invention is preferably 70/30 to 30/70. When amount of the natural rubber is more than 70% by weight, there is a remarkable reduction in the wet skid resistance, whereas when it is less than 30% by weight, the breaking strength remarkably falls, and therefore, this is not preferred.

The silica filler used in the composition of the present invention may be any silica (or white carbon) used as a blending agent for rubber. The amount to be blended is 20 to 70 parts by weight per 100 parts by weight of the rubber component, preferably 25 to 60 parts by weight. When the amount of the silica filler to be blended is less than 20 parts by weight, the effect of the silica filler is small and the wear resistance becomes inferior. Contrary to this when it is more than 70 parts by weight, the tensile properties are poor, and therefore, this is not preferred. The silica filler used in the present invention is preferably Nipsil VN3 (made by Nihon Silica), Tokuseal U, UR (made by Tokuyama Soda), Ultrazil VN3 (made by Degussa), or other wet type silicas.

The tire tread rubber composition according to the present invention requires the combined use of ordinarily used carbon black in addition to the silica as a filler so as to obtain a good wear resistance. The carbon black used in the present invention preferably is one having a reinforcing property of at least HAF in consideration of the wear resistance. That is, the carbon black having a nitrogen adsorption ($N_2SA$) (measured in accordance with method of ASTM D3037-86) of 80 to 130 $m^2/g$ and a DBP oil absorption (measured in accordance with method of ASTM D3493) of 80 to 130 $cm^3/100g$ is included in an amount of 20 to 70 parts by weight, preferably 25 to 60 parts by weight. When the amount of the carbon black to be blended is less than 20 parts by weight, the wear resistance is inferior, whereas when it exceeds 70 parts by weight, the rolling resistance is inferior, and therefore, this is not preferred.

The present inventors studied the method of mixing the rubber composition according to the present invention intensively and thereupon discovered that molecular shearing of the natural rubber easily occurs at high speed and high temperature mixing compared with ordinary mixing, and therefore there are more radicals of the cleavaged terminals and the reaction with silica proceeds, whereby the dispersion is improved.

Note that the tire tread rubber composition of the present invention may have been suitably blended in the range of ordinary blending amount, optionally, blending agents usually used in the rubber industry, for example, sulfur, softening agents, antioxidants, vulcanization accelerators, fillers, plasticizers, etc. in addition to the starting rubber, silica, and carbon black and that it may be vulcanized by a general method to produce a tire tread. For example, the amount of the sulfur to be blended is preferably at least 1.2 parts by weight, more preferably 1.5 to 3.0 parts by weight, per 100 parts by weight of the rubber blend.

EXAMPLES

The present invention will now be further illustrated by, but is by no means limited to, the following Examples.

In the following Examples, the microstructure of the butadiene moiety was determined by the Hampton-Moreno method of the infrared absorption spectrum method. The bound styrene content was measured by using a calibration curve found in advance from the absorption of the 699 cm$^{-1}$ phenyl group by the infrared absorption spectrum method.

The physical properties (100% modulus, TB, EB) of the vulcanizates were measured by JIS (i.e., Japanese Industrial Standards) K6301 (tensile speed: 500±25 mm/min, test temperature: 23±2° C.).

The Lambourne abrasion test, a test of the abrasion resistance, was performed under measurement conditions of a load of 3.0 kg, a surface speed of the grindstone of 40 m/min, a slip rate of 25% or 35%, a measurement time of 5 minutes at a slip rate of 25% and 2 minutes at a slip rate of 35%, a fallen sand of 20 g/min, and a measurement temperature of room temperature, so as to determine the decrease in volume (cc). The results were shown by indexes using as 100 the data of 25° C. of Comparative Example 2. The higher the index, the better.

The tan δ was measured using a spectrometer made by Toyo Seiki Seisakusho at an amplitude of ±2% a vibration of 20 Hz, and a static strain of 10%.

The wet skid resistance was measured based on the method of ASTM E-303 by a British Portable Pendrum Tester at room temperature and at 0° C.

Examples 1 to 4 and Comparative Examples 1 to 7

Eleven types of rubber compositions were mixed and kneaded according to an ordinary method by a Banbury mixer and kneading roll machine in the formulations shown in Table 1 (parts by weight) to prepare the samples (Comparative Examples 1 to 7 and Examples 1 to 4). These rubber compositions were press-vulcanized at 160° C. for 20 minutes to prepare the desired test pieces. Various tests were then performed to measure their physical properties.

The results are shown in Table 1.

TABLE 1

(parts by weight)

| | Comparative Examples | | | Examples | | Base recipe (parts by weight) |
|---|---|---|---|---|---|---|
| | 1 | 2 | 3 | 1 | 2 | |
| Recipe | | | | | | Polymer 100 |
| Natural rubber | — | 50 | 50 | 50 | 50 | Zinc oxide 3 |
| SBR-1*[1] | 100 | 50 | 50 | — | — | Stearic acid 2 |
| SBR-2*[2] | — | — | — | 50 | 50 | Antioxidant 2 |
| SBR-3*[3] | — | — | — | — | — | Oil 8 |
| SBR-4*[4] | — | — | — | — | — | Vulcanizing |
| SBR-5*[5] | — | — | — | — | — | accelerator*[9] 0.7 |
| Silica*[6] | — | — | 25 | 25 | 35 | Sulfur 1.7 |
| Carbon black*[7] | 50 | 50 | 25 | 25 | 15 | |
| Silane coupling agent*[8] | — | — | 3 | 3 | 3 | |
| 100% modulus | 28.0 | 25.3 | 28.5 | 28.5 | 29.3 | |
| Tensile strength (kg/cm$^2$) | 248 | 242 | 238 | 215 | 218 | |
| Elongation at break (%) | 441 | 440 | 437 | 390 | 391 | |
| tan δ | | | | | | |
| 0° C. | 0.268 | 0.270 | 0.270 | 0.425 | 0.425 | |
| 60° C. | 0.130 | 0.140 | 0.130 | 0.081 | 0.078 | |
| Wet skid resistance | | | | | | |
| Room temperature | 88.0 | 88.5 | 88.2 | 92.3 | 91.1 | |
| 0° C. | 90.0 | 90.1 | 91.0 | 93.3 | 92.3 | |
| Lambourne abrasion (index) | | | | | | |
| 25% | 113 | 100 | 115 | 104 | 96 | |
| 35% | 108 | 96 | 117 | 117 | 118 | |

| | Comparative Examples | | | Examples | | Comp. Ex. | Base recipe (parts by weight) |
|---|---|---|---|---|---|---|---|
| | 4 | 5 | 6 | 3 | 4 | 7 | |
| Recipe | | | | | | | Polymer 100 |
| Natural rubber | 50 | 30 | 70 | 50 | 50 | 50 | Zinc oxide 3 |
| SBR-1*[1] | — | — | — | — | — | — | Stearic acid 2 |

TABLE 1-continued

| | | | | | | | |
|---|---|---|---|---|---|---|---|
| SBR-2*[2] | 50 | 70 | 30 | — | — | — | Antioxidant 2 |
| SBR-3*[3] | — | — | — | 50 | — | — | Oil 8 |
| SBR-4*[4] | — | — | — | — | 50 | — | Vulcanizing |
| SBR-5*[5] | — | — | — | — | — | 50 | accelerator*[9] 0.7 |
| Silica*[6] | 5 | 25 | 25 | 25 | 25 | 25 | Sulfur 1.7 |
| Carbon black*[7] | 45 | 25 | 25 | 25 | 25 | 25 | |
| Silane coupling agent*[8] | 3 | 3 | 3 | 3 | 3 | 3 | |
| 100% modulus | 28.6 | 28.7 | 28.3 | 29.5 | 32.5 | 28.7 | |
| Tensile strength (kg/cm$^2$) | 210 | 208 | 213 | 238 | 267 | 204 | |
| Elongation at break (%) | 382 | 378 | 404 | 422 | 425 | 359 | |
| tan δ | | | | | | | |
| 0° C. | 0.430 | 0.460 | 0.30 | 0.35 | 0.30 | 0.21 | |
| 60° C. | 0.111 | 0.110 | 0.08 | 0.085 | 0.089 | 0.07 | |
| Wet skid resistance | | | | | | | |
| Room temperature | 90.0 | 92.7 | 87.0 | 91.0 | 90.3 | 81.0 | |
| 0° C. | 91.0 | 94.0 | 85.0 | 92.3 | 91.7 | 84.0 | |
| Lambourne abrasion (index) | | | | | | | |
| 25% | 74 | 64 | 96 | 104 | 107 | 136 | |
| 35% | 108 | 104 | 112 | 114 | 114 | 130 | |

Notes of Table 1
*[1]Bound styrene content 23.5% vinyl content 14.9%
*[2]Bound styrene content 13.8%, vinyl content 78.4%, terminal-modified with 4,4'-bis(diethylaminobenzophenone)
*[3]Bound styrene content 20.6%, vinyl content 66.5%, terminal-modified with 4,4'-bis(diethylaminobenzophenone)
*[4]Bound styrene content 23.2%, vinyl content 37.3%, terminal-modified with N-methyl-2-pyrrolidone
*[5]Bound styrene content 5.0%, vinyl content 10.0%, terminal-modified
*[6]Nipsil VN3
*[7]HAF (N$_2$SA: 88 M$^2$/g, DBP oil absorption: 110 cm$^2$/100 g)
*[8]bis-(3-triethoxysilylpropyl)tetrasulfide
*[9]N-cyclohexyl-2-benzothazole-sulfeneamide As clear from Table 1, Comparative Examples 1 and 2 are a natural rubber system or natural rubber/SBR system to which has been added carbon black, but the wet skid resistance is not sufficient in either of these Comparative Examples. Comparative Example 1 is a natural rubber/carbon black system and has a low Tg, and therefore, the wet skid resistance is not sufficient. Comparative Example 2 is a general use SBR/natural rubber system, but here too the wet skid resistance is not sufficient. Further, both Comparative Example 1 and 2 have a high 60° C. tan δ and the rolling resistances are not preferable either.

Comparative Example 3 is a silica/carbon black blend system, but the rubber component is a natural rubber/general use SBR system, so the wet skid resistance is not sufficient. Comparative Example 4 is a natural rubber/high vinyl SBR, but the amount of the silica blended in is small, and therefore, the wear resistance is not sufficient. Further, the breaking strength is also not sufficient.

Comparative Example 5 is a combination system of natural rubber/high vinyl SBR/silica, but the amount of the SBR blended in is large, so the wear resistance is not sufficient and the breaking strength is not sufficient either. Comparative Example 6 has a large amount of natural rubber blended in, and therefore, the wet skid resistance is not sufficient. Comparative Example 7 is a natural rubber/SBR system, but the SBR used has a low styrene content and a low vinyl content, so the wet skid resistance is not sufficient.

Compared with the Comparative Examples, Examples 1, 2, 3, and 4 are combinations of natural rubber/high vinyl SBR/silica/carbon black according to the present invention and are balanced in the wet skid resistance, the tan 67 (60° C.), and the wear resistance.

As explained above, the rubber composition for a tire tread according to the present invention, which is comprised of a combination of natural rubber/high vinyl SBR/silica/carbon black is suitable for the production of a tire which simultaneously achieves a high wet skid resistance, low rolling resistance, and high wear resistance.

We claim:

1. A rubber composition for a tire tread comprising (i) 100 parts by weight of a rubber component comprising (a) natural rubber and (b) a styrene-butadiene copolymer rubber terminally modified with at least one compound selected from the group consisting of N,N-dimethylnicotine amide, N,N,N',N'-tetramethylurea, N,N,N',N'-tetramethylaminoacetoamide, N-methyl-2-pyrolidone, N-methyl-ε-caprolactam, 4,4'-bis(diethylaminobenzophenone), and diphenylmethane-diisocyanate and having a vinyl content in the butadiene portion of 35 to 80% by weight and a styrene content of 10 to 40% by weight wherein the total amount of these rubbers is at least 80% by weight of the total rubber component and wherein the amount of the styrene-butadiene copolymer rubber is 20 to 60% by weight of the total rubber component, (ii) 20 to 70 parts by weight of silica and (iii) 20 to 70 parts by weight of carbon black.

2. A rubber composition as claimed in claim 1, wherein the weight ratio of the natural rubber/the styrene-butadiene copolymer rubber is 70/30 to 30/70.

3. A rubber composition as claimed in claim 1, wherein the silica is a wet type silica.

4. A rubber composition as claimed in claim 1, wherein the carbon black has a nitrogen adsorption (N$_2$SA) of 80 to 130 m$^2$/g, determined by an ASTM D3493 method, and a DBP oil absorption of 80 to 130 cm$^3$/100g, determined by an ASTM D3493 method.

* * * * *

UNITED STATES PATENT AND TRADEMARK OFFICE
CERTIFICATE OF CORRECTION

PATENT NO. : 5,500,482
DATED : March 19, 1996
INVENTOR(S) : Takao Muraki et al.

It is certified that error appears in the above-indentified patent and that said Letters Patent is hereby corrected as shown below:

Title page, Abstract, line 6, change "80" to --80%--.

Signed and Sealed this

Fourth Day of June, 1996

Attest:

BRUCE LEHMAN

*Attesting Officer*    *Commissioner of Patents and Trademarks*